Patented Sept. 14, 1937

2,093,106

UNITED STATES PATENT OFFICE 2,093,106

SILICA PIGMENTS

Joseph W. Ayers, Easton, Pa., assignor to C. K. Williams & Co., Easton, Pa., a corporation of Pennsylvania No Drawing. Application September 26, 1934, Serial No. 745,523

6 Claims. (Cl. 134—58)

This invention relates to silica products particularly suitable as pigments for use in paints, varnishes, lacquers and the like, and to processes of producing the same. The products are composed of altered naturally occurring silica rather than of artificially prepared silica, as will be hereinafter more definitely described.

For many years there has been a demand in industry for a low priced white filling and extending pigment. Many compounds have been proposed for this purpose and some have been employed, such for instance as asbestine, china clay and barytes, which compounds have not been satisfactory either because of poor hiding power, poor suspension properties, high cost of raw material or of preparation, or any two or more of these deficiencies.

Silica even in the finest grades of so-called amorphous silica has heretofore not proven satisfactory as a pigment ingredient for paints because (1) it is highly abrasive and therefore destructive to the rolls used for grinding pigments into paints, (2) it usually contains discoloring impurities and (3) its specific gravity interferes with its ready suspension in normal paint vehicles.

The principal object of the present invention is to provide a silica product having all the necessary properties for a filling and extending pigment and from which the detrimental properties have been removed.

To accomplish this result I produce a treated silica product from a soft silica rock of microcrystalline structure such as that found in large deposits in southern Illinois, sometimes erroneously spoken of as "amorphous" silica.

As described in geological reports, this silica, referred to generally as Illinois soft silica, is a chalcedonic silica produced by the slow weathering of chalcedony. It is of a micro-crystalline-fibrous structure, contains small quantities of a number of impurities including iron compounds and has a specific gravity of about 2.65. To the unaided eye it appears to be amorphous in character, but in its natural condition it is truly crystalline.

The novel silica product of the present invention is produced from the soft silica rock of the nature above described briefly by grinding to a desired particle size, washing to remove soluble impurities and bleaching and calcining for a period and at a temperature adapted to bring about the desired changes as will hereinafter be pointed out. This treatment has a marked effect upon the silica particularly in decreasing its specific gravity and in increasing its opacity or index of refraction.

In accordance with a detailed preferred embodiment of the process for the production of the silica suitable as a pigment, the Illinois soft silica after being mined is crushed and then ground to the desired size preferably in a ball mill in the presence of water after which it is lixiviated, settled, filtered and dried. The dried product although of the desired fineness is still crystalline and has the same specific gravity as the original, namely 2.65. To the dried product, I then add a bleaching agent, for example, ammonium chloride, preferably in a ratio of about one-quarter to five per cent. by weight of the silica to be treated, after which the mixture is calcined or heated at temperatures suitably of from about 1000° to 1800° F. for a period of from about fifteen minutes to two hours, depending upon the amount of iron present and the degree of bleaching desired. At no time during the calcining operation is the silica sintered as this is to be avoided because of the formation of objectionable agglomerations which would necessitate further grinding.

The effect of this combined bleaching and calcining operation on the silica particles is manifold. During the calcining operation the crystalline character of the particles is changed to an amorphous character. The specific gravity of the material is reduced from 2.65 to 2.32 or about 11%, the oil absorption is increased from 25.3% to 28.2%, the refractive index is changed from 1.56 to 1.55 and the percent reflecting power as indicated by spectrophotometric curves is increased from 91% to 96% or over through the wave lengths of 400 to 700 millimicrons.

The decrease in specific gravity gives greater volume loading and the increase in fluffiness reduces the abrasiveness and provides better suspension properties in oil. The product prepared in this manner is suitable for pigment purposes, without further treatment.

The equipment used in effecting the above process does not constitute part of the present invention. However, certain types of apparatus have proved quite valuable from the commercial point of view. For example, the calcination has been most effectively carried out in a continuously rotating kiln of a construction already known in the art.

Instead of ammonium chloride, other inorganic salt bleaching agents may be employed with more or less success. Ammonium chloride is preferred because it is completely volatilized during calcination and thus does not leave a diluent in the pigment. The amount of bleaching agent required and the time of calcination are dependent upon the quantity of iron and other impurities in the silica and the degree of bleaching or whiteness desired in the final product, and also upon the time of change of the particles from their crystalline to amorphous condition as indicated by the reduction in specific gravity from 2.65 to 2.32.

Alternatively the bleaching agent may be added in the form of a solution to the wet cake obtained from the filter press and the material calcined directly, thereby saving the cost of one drying operation. The bleaching effect, however, is somewhat better when the bleaching agent is added to the dried silica in dry form. When the silica product is to be used as an addition to white enamels, etc., containing other white opaque pigments it has been found that a grinding operation after the calcination considerably improves the texture of the pigment.

The process of the present invention increases the amorphous characteristics of the silica to a substantial degree. For example the specific gravity is reduced from 2.65 to about 2.32 or between 2.320 and 2.350 which change increases the bulkiness of the product and also increases its ability to remain suspended in the liquid components of paints and the like. A powdered mass produced from the herein described raw product without employing the bleaching and calcining operations has poor hiding power and very poor suspension properties.

By the present process the reflective power or whiteness of the silica is increased on the average of about 5½%. This change greatly increases the value of the product because of its increased hiding power. Abrasive properties which are so objectionable in the manufacture of certain white paints such, for example, as those employed on steel roller mills, are destroyed to a substantial degree by the herein described treatment.

The product of the present invention should not be confused with kieselguhr products which are essentially porous diatomaceous earth products produced for use in the filtration and purification of various fluids by absorption or adsorption. Silica on the other hand in its natural state is a crystalline non-porous abrasive material. Kieselguhr also has been used in paints as a flatting agent, but is not suitable as a filling or extending pigment because it is transparent and is highly porous. Its high oil absorption properties makes it unsuitable in gloss white enamels, for it has a deleterious effect on the luster and brightness of the surface of the film. In contrast thereto the silica products of the present invention can be very effectively used in such enamels.

While the process of the present invention has been described in detail as to the preferred steps, it should be understood that various changes may be made therein and the beneficial product herein described may be produced by other steps coming within my invention and the scope of the claims hereto attached.

I claim:

1. A process of producing a pulverized, amorphous, white silica pigment free of agglomerations and having lower specific gravity, higher reflecting power, better suspension properties, a lower refractive index and less abrasiveness than micro-crystalline soft silica, comprising grinding micro-crystalline soft silica, lixiviating and drying the pulverized mass, adding a small quantity of ammonium chloride, and heating the mass to a temperature of from about 1000–1800° F.

2. A filling and extending pigment for paints, enamels, varnishes and the like consisting of an amorphous soft silica powder having a specific gravity at least 10% lower and a lower refractive index and a reflecting power substantially 5% or more higher and a higher oil absorption property as compared with natural chalcedonic silica and produced by calcining said natural chalcedonic silica, which has been pulverized and lixiviated, in the presence of a bleaching agent at temperatures between 1000 and 1800° F.

3. A process of producing a pulverized, amorphous, white silica pigment free of agglomerations and having lower specific gravity, a reflecting power substantially 5% or more higher, better suspension properties and less abrasiveness than microcrystalline soft silica, comprising grinding micro-crystalline soft silica, lixiviating and drying the pulverized mass, adding a small quantity of an inorganic chloride salt for effecting removal of color, and heating the mass to a temperature of from about 1000 to 1800° F.

4. A process of producing a pulverized, amorphous, white silica pigment free of agglomerations and having lower specific gravity, higher reflecting power, better suspension properties, a lower refractive index and less abrasiveness than microcrystalline soft silica comprising grinding micro-crystalline soft silica, adding .25 to 5% by weight of ammonium chloride thereto and heating the mass to a temperature of from about 1000 to 1800° F.

5. A filling and extending pigment for paints, enamels, varnishes and the like consisting of an amorphous soft silica powder having a specific gravity at least 10% lower and a lower refractive index and a reflecting power substantially 5% or more higher and a higher oil absorption property as compared with natural chalcedonic silica and produced by calcining said natural chalcedonic silica, which has been pulverized, in the presence of a bleaching agent at temperatures between 1000 and 1800° F.

6. A filling and extending pigment for paints, enamels, varnishes and the like consisting of an amorphous soft silica powder having a specific gravity at least 10% lower and a lower refractive index and a reflecting power substantially 5% or more higher and a higher oil absorption property as compared with natural chalcedonic silica and produced by calcining said natural chalcedonic silica, which has been pulverized, in the presence of ammonium chloride at temperatures between 1000 and 1800° F.

JOSEPH W. AYERS.